United States Patent Office 3,436,452
Patented Apr. 1, 1969

3,436,452
TREATMENT OF CAPSULES IN LIQUID TO INHIBIT CLUSTERING
Theodore Maierson, Dayton, Ohio, assignor to The National Cash Register Company, Dayton, Ohio, a corporation of Maryland
No Drawing. Filed Mar. 30, 1966, Ser. No. 538,578
Int. Cl. B29c 25/00
U.S. Cl. 264—344
6 Claims

ABSTRACT OF THE DISCLOSURE

A process is disclosed for treating water-swollen capsule walls en masse, in liquid treatment vehicle, to prevent the capsules from aggregating during an isolation and drying step. The treatment includes contact of the swollen capsule walls with cationic surfactant materials which have been dissolved or dispersed in the treatment vehicle.

---

This invention relates to a process for treating, en masse, capsules which have, as walls, water-swellable, hydrophilic, polymeric material. More specifically, it pertains to a method for treating substantially gelatin-walled capsules to facilitate their isolation as minute, rigid-walled, entities without their clumping together or aggregating.

Capsules which have walls of such hydrophilic polymeric material and are prepared from a water solution thereof exist, in the aqueous manufacturing medium, as entities having a high percentage of water remaining in the polymeric material of the capsule walls. In order to isolate these entities as individual, non-tacky, rigid-walled capsules, the polymeric wall which has been wrapped around the core entity must be dried. The hydrophilic polymeric materials, in drying, pass through a tacky stage. In this tacky stage, the capsules have a tendency to aggregate and dry in clumps rather than as individual entities. Although many end uses for encapsulated materials successfully utilize clusters or clumps of capsules, there are a number of uses for encapsulated materials in the form of free-flowing, individual, rigid-walled entities, particularly of minute dimensions, varying in size from less than one micron to greater than one thousand microns, or somewhat larger.

It is the object of this invention to provide a method for preparing the identified individual capsule entities from a liquid capsule-dispersing medium—usually the capsule-manufacturing vehicle itself, which is aqueous—but the capsules may be treated also in a non-aqueous medium, as will be explained.

The hydrophilic polymeric materials which form the capsule walls of the preferred embodiment of this invention are substantially gelatin and a complexing material, being the result of an electric polarity interaction between solutions of gelatin and a second ionizable hydrophilic colloid material. The formation of this capsule wall material, in one instance, by phase separation (coacervation), is fully described in United States Patent No. 2,800,457, issued July 23, 1957, on the application of Barrett K. Green and Lowell Schleicher. In the present invention, capsules made by the above-mentioned patented process are treated in a liquid vehicle with one or more cationic surfactant materials in order to reduce the otherwise existent tendency for aggregation of individual capsule entities. "Surfactant materials" refers to chemical compounds which have, in their molecular structures, both hydrophilic and hydrophobic regions and which, because of this, have the capability of considerably reducing the interfacial free energy between water and a second material surface—in this case gelatin. For use in the practice of this invention, the hydrophobic portion of the surfactant molecules used includes hydrocarbon chains usually of from 8 to 18 carbon atoms in length, and the hydrophilic portion of the molecules includes cationic groups which are in the form of primary amine acetates and quaternary amine salts. Examples of such materials are primary fatty amine derivatives of tallow, hydrogenated tallow, and vegetable fats and oils or the like; and quaternary chloride salts including trimethyl arachidyl-behenyl quaternary, dimethyl hydrogenated tallow furfuryl quaternary, and dimethyl di-hydrogenated tallow quaternary, or the like. The novel treatment of swollen, hydrophilic, polymeric materials, typified by gelatin, is practiced on capsules having walls which have been rendered insoluble by the action of formaldehyde, glutaraldehyde, or other gelatin-crosslinking agent, as taught by the aforementioned Green and Schleicher United States patent.

With the above considerations in mind, the following examples will serve to further illustrate the invention and its embodiments.

Example I (Preferred)

To a vessel containing 180 grams of an 11%, by weight, aqueous solution of high-quality, acid-extracted pigskin gelatin (isoelectric point pH 8–9; Bloom strength 285 to 305 grams), whose pH had been adjusted to 9.0, and 200 grams of distilled water, both having a temperature of 55 degrees centigrade, was added 250 grams of toluene. Agitation was initiated and adjusted to yield a toluene droplet size of 100 to 200 microns in diameter. To the above, stirring, system were added 180 grams of 11%, by weight, aqueous gum arabic solution, 25 milliliters of 5%, by weight, aqueous solution of polyvinylmethylethermaleic anhydride copolymer—further described in United States Patent No. 3,041,289, issued on the application of Bernard Katchen and Robert E. Miller on June 26, 1962 ("Gantrez AN" as sold by General Aniline and Film Company, New York, N.Y., United States of America)—and 800 milliliters of distilled water, all at a temperature of 55 degrees centigrade. The pH was reduced to 6.2 by the use of acetic acid, and the mixture was cooled to 25 degrees centigrade over a three-hour period, after which time it was chilled to 10 degrees centigrade, and the pH was further reduced to 4.5. After stirring for an additional half-hour, 20 milliliters of a 25%, by weight, aqueous solution of glutaraldehyde was added, and the system was stirred for about sixteen hours—the temperature slowly rising to ambient.

Agitation was stopped, and the toluene-containing capsules were allowed to separate from the equilibrium liquid, which required one to two hours. The equilibrium liquid was discarded, and the capsules were dispersed and washed in 500 milliliters of distilled water, which was subsequently separated and discarded. The capsule slurry was then redispersed in a solution of 500 milliliters of distilled water and 1.25 grams of one of the eligible quaternary amine surfactants, such as "Adogen 446" as sold by Archer-Daniels-Midland Company, Minneapolis, Minnesota, United States of America, and the system was stirred for more than fifteen minutes. Then 20 grams of a 5%, by weight, aqueous solution of another eligible surfactant—this time a primary amine acetate salt, such as "Armac HT" as sold by Armour Chemical Company, Chicago, Ill., United States of America—was added, and the stirring was maintained for an additional fifteen minutes. Stirring then was stopped, and the capsules were allowed to separate for about thirty minutes, at which time the equilibrium liquid was discarded, the capsule slurry was further de-watered in a centrifugal separator, and the resulting cake-like mass of wet capsules was broken into small lumps about one quarter-inch in diameter, spread onto a plate, and dried in a circulating air oven at 88 degrees centigrade for sixty to ninety minutes.

It should be noted that the combination of surfactants in a certain order, as described in this, the preferred, example, is not necessary to practicing the invention except in degree of excellence in the results as now known. For reasons not entirely understood, the technique and the materials of the preferred example yield a greater amount of individual capsules than other, similar, methods falling within the embrace of the invention. The invention can be successfully practiced by using only one or a combination of more than one of the disclosed surfactant materials; and, if more than one surfactant is elected for use, the order of addition can be varied, or both may be used at the same time. As a general rule, the surfactants are added to reach a total surfactant material concentration of 5% to 10%, by weight, on the basis of gelatin present in the system, although 2% to 20%, by weight, of surfactant material or more is tolerated.

Because the surface area of capsule walls relative to gelatin weight of a mass of capsules increases with the decrease in capsule dimensions, it is apparent that the ratio of surfactant to weight of gelatin would increase as the capsule average dimension decreases. The range of surfactant-to-gelatin weight has been made rather broad with this in mind. An excess of surfactant need not be feared, whereas the opposite is to be guarded against.

The size of capsules treated by the novel method has varied from less than five microns to several thousand microns, capsules less than one hundred microns requiring that the final drying be carried out in a spray drying apparatus rather than with the fluid-bed blower mentioned in the following examples. About fifteen minutes' contact of the surfactant-containing liquid vehicle with the capsules is required at 25 degrees centigrade (room temperature) for best results.

Example II

The capsules for this example were prepared identically with those of the preferred example. After separation of the equilibrium liquid, the wash with distilled water, and addition of the second 500-milliliter volume of water, 2.50 grams of one of the eligible quaternary amine surfactants—such as "Adogen 401" as sold by Archer-Daniels-Midland Company, Minneapolis, Minn., United States of America—was added, and the system was stirred for thirty minutes, after which time the process was completed identically with the preferred example.

Toluene was chosen as the material to be encapsulated in these examples for illustrative purposes only. It is understood, as obvious, that the nature of the core material, or internal phase, of capsules processed by the novel method is unimportant. As the process is concerned with the external surface condition of the capsule wall only, capsules containing any material, solid, liquid, or gas, can be treated according to the teachings of this invention.

Example III

In this example, the capsules, as prepared in the preferred example, were used but were de-watered to a dense cake after the second addition of 500 milliliters of distilled water. This cake of swollen-walled capsules was then crumbled into a one-liter volume of Petroleum Distillate #1 (volatile petroleum fraction having an initial boiling point of 140 to 150 degrees Fahrenheit and a final boiling point of 215 degrees Fahrenheit), into which had been dissolved 10 grams of "Armac HT" as used in Example I. The mixture was stirred for about thirty minutes, during which time the capsules became dispersed and individually separated. As before, after the necessary surfactant reaction contact time had elapsed, the agitation was stopped and the liquid was separated. The slurry was filtered to remove more solvent, and the resulting filter cake was crumbled onto a screen to be subjected to the last operation, which was the evaporation of the petroleum distillate and residual water in the capsule walls by blowing air through the screen.

As demonstrated in this Example III, an aqueous treating vehicle is not necessary to the practice of this invention, but the liquid in which the capsules are treated must be capable of dissolving the surfactant materials used.

Example IV

In this example, the capsules of the preferred example were prepared with the agitation vigorous enough to form capsules from five to twenty microns in diameter. After the treatment with surfactants, as disclosed in the preferred example, the capsules were dried by means of a spray drier because the capsules were smaller.

What is claimed is:

1. A process for treating, en masse, individual minute capsules each having, as an existing wall encasing a core entity, a water-swollen hydrophilic polymeric material film, so that the capsule walls when dried in close physical relation will not form a coherent mass of capsules but will maintain their individual status, including the steps of
    (a) establishing a liquid slurry of the capsules and a cationic surfactant material therefor in a concentration of 2 to 20 percent, by weight, of the hydrophilic polymeric material, and
    (b) drying the slurry of capsules by draining and evaporation of the liquid.

2. The process of claim 1 wherein the cationic surfactant is at least one selected from the group of cationic surfactants consisting of primary aliphatic amine salts having 14 to 18 carbon atoms in the hydrocarbon groups and quaternary ammonium compounds having alkyl groups with 1 to 22 carbon atoms.

3. The process of claim 2 wherein the water-swollen hydrophilic polymeric material of the existing capsule wall to be treated comprises gelatin.

4. The process of claim 3 wherein the concentration of surfactant materials is 2% to 20%, by weight, based on the total gelatin present in the system.

5. A process for treating, en masse, minute capsules each having, as an existing wall encasing the core entity, a water-swollen hydrophilic polymeric material film; said film of the capsules being treated according to the following steps:
    (a) establishing an aqueous slurry of untreated capsules and introducing therein, in a concentration of 2 to 20 percent, by weight, of the hydrophilic polymeric material, the acetate salt of a primary aliphatic amine compound having from 14 to 18 carbon atoms on the hydrocarbon chain and agitating the slurry for a time of fifteen minutes to three hours;
    (b) adding to the agitating system of (a) a quaternary ammonium compound, in a concentration of 2 to 20 percent, by weight, of hydrophilic polymeric material, having at least one group consisting of an aliphatic carbon chain of from 14 to 18 carbon atoms, and the remaining groups consisting of alkyl or heterocyclic groups, and agitating the slurry for a time of fifteen minutes to three hours; and
    (c) drying the capsules by draining and evaporation until the individual capsule entities are separated and have rigid non-tacky walls.

6. A process for treating, en masse, minute capsules each having, as an existing wall encasing the core entity, a water-swollen hydrophilic polymeric material film; said film of the capsules being treated according to the following steps:
    (a) establishing an aqueous slurry of untreated capsules and introducing therein, in a concentration of 2 to 20 percent, by weight, hydrophilic polymeric material, a quaternary ammonium compound having at least one group consisting of an aliphatic carbon chain of from 14 to 18 carbon atoms, and the remaining groups consisting of alkyl or heterocyclic groups, and agitating the slurry for a time of fifteen minutes to three hours;

(b) adding to the agitating system of (a), in a concentration of 2 to 20 percent, by weight, hydrophilic polymeric material, the acetate salt of a primary aliphatic amine compound having from 14 to 18 carbon atoms on the hydrocarbon chain, and agitating the slurry for a time of fifteen minutes to three hours; and (c) drying the capsules by draining and evaporation until the individual capsule entities are separated and have rigid, non-tacky walls.

References Cited

UNITED STATES PATENTS

| | | | |
|---|---|---|---|
| 2,129,264 | 9/1938 | Downing et al. | 252—357 X |
| 2,722,515 | 11/1955 | Reamer | 252—311.5 X |
| 2,800,457 | 7/1957 | Green et al. | 252—316 |

RICHARD D. LOVERING, *Primary Examiner.*

U.S. Cl. X.R.

117—100; 252—316, 384; 264—4; 424—16, 25, 31, 37